L. REYES.
CONDIMENT HOLDER.
APPLICATION FILED OCT. 13, 1919.
1,330,720.
Patented Feb. 10, 1920.
2 SHEETS—SHEET 1.
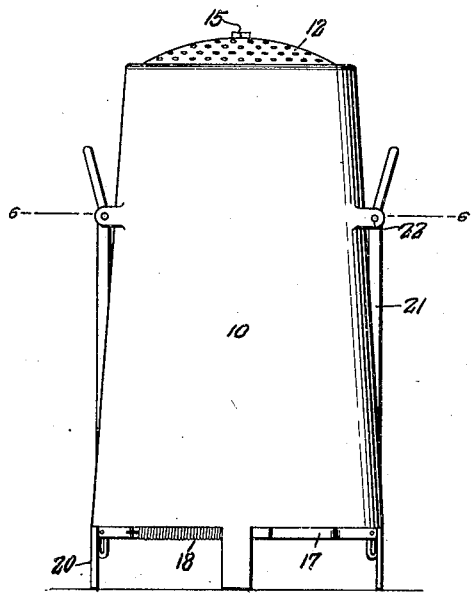
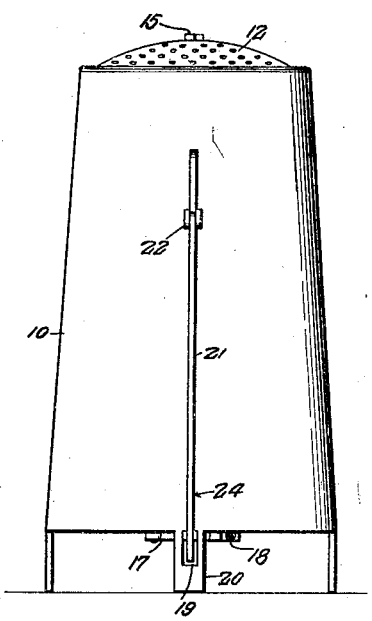
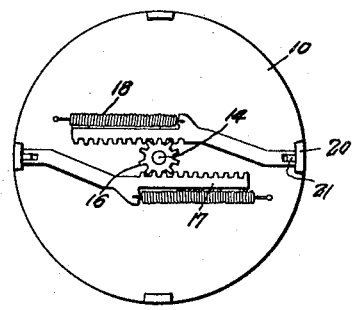
WITNESSES
INVENTOR.
BY Lorenzo Reyes,
ATTORNEY.

L. REYES.
CONDIMENT HOLDER.
APPLICATION FILED OCT. 13, 1919.
1,330,720.
Patented Feb. 10, 1920.
2 SHEETS—SHEET 2.
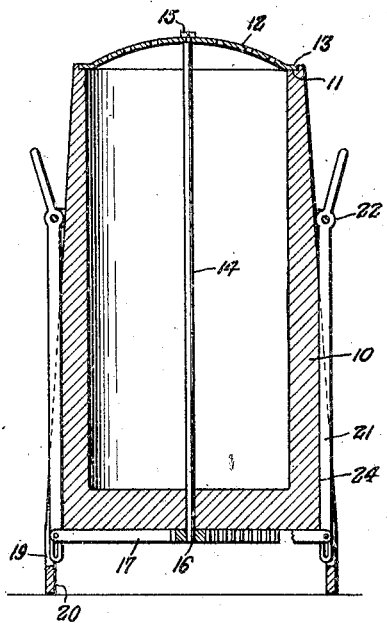
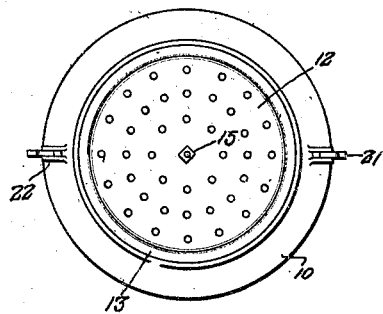
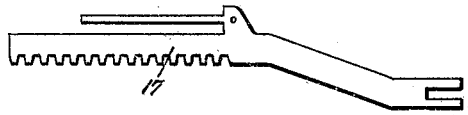
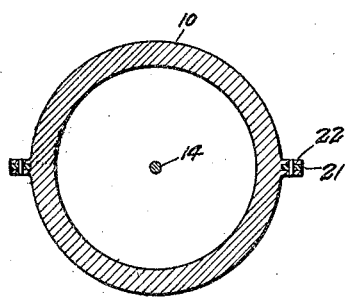
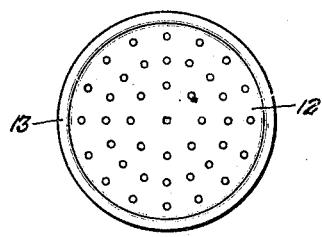
WITNESSES
INVENTOR.
BY Lorenzo Reyes,
ATTORNEY.

UNITED STATES PATENT OFFICE.

LORENZO REYES, OF SAN FRANCISCO, CALIFORNIA.

CONDIMENT-HOLDER.

1,330,720.	Specification of Letters Patent.	Patented Feb. 10, 1920.

Application filed October 13, 1919. Serial No. 330,214.

*To all whom it may concern:*

Be it known that I, LORENZO REYES, a citizen of the United States, residing at San Francisco, in the county of San Francisco and State of California, have invented new and useful Improvements in Condiment-Holders, of which the following is a specification.

This invention relates to condiment holders and has for its object the provision of a holder especially adapted for salt, which is provided with means for moving or agitating the perforated cover to clear the perforations, so as to permit of the free passage of the contents of the receptacle through the cover.

Another object is the provision of novel means for securing the perforated cover in position and for causing the rotation of the same to keep the perforations clear.

A still further object is the provision of a condiment holder, which is neat and attractive in appearance and which will permit of the passage of its contents through the perforated cover, when desired.

Other objects and advantages of the invention will appear as the following description is read in connection with the accompanying drawings.

In the drawings:

Figure 1 is a side elevation.

Fig. 2 is a similar view taken at right angles to Fig. 1.

Fig. 3 is a top plan view.

Fig. 4 is a bottom plan.

Fig. 5 is a vertical sectional view.

Fig. 6 is a horizontal section on the line 6—6 of Fig. 1.

Fig. 7 is a detail view of the perforated top.

Fig. 8 is an enlarged view of one of the racks.

Referring to the drawings in detail, like characters of reference denote corresponding parts throughout the several views.

In the practical embodiment of the invention, and herein shown there is provided a receptacle, which is indicated at 10. This receptacle may be of any desired size and shape and is provided with an open top having an inner annular shoulder 11 which forms a seat for the perforated top 12, the latter having a flange 13, which rests upon the shoulder 11. Extending centrally and longitudinally through the receptacle 10, is a shaft 14, the upper end of which is secured to the top 12, by means of a locking nut 15, which permits of the ready separation of the shaft and top, when desired, for the purpose of filling the receptacle. The opposite end of the shaft 14 extends through the bottom of the receptacle, and is provided with a gear 16, which is adapted to engage the teeth of oppositely arranged racks 17. These racks are urged in opposite directions through the medium of springs 18.

The outer opposite ends of the racks 17 extend through openings 19, formed in supporting legs 20, and pivotally secured to these ends are the lower ends of levers 21. The levers 21 are pivotally mounted between ears 22, and operating in grooves 24 formed in the opposite sides of the receptacle 10.

In the use of the invention, pressure is exerted upon the upper ends of the pivoted levers 21, causing the racks 17 to move in opposite directions and rotate the shaft 14 and the top 12. This rotation of the top serves to dislodge any particles of salt which might cling to the top in a manner to close the perforations.

The invention provides an exceedingly useful article for the purpose intended and the right is herein reserved to make any changes in its form, proportions and minor details of construction that properly fall within the scope of the appended claims.

Having described the invention, what is claimed is:

1. A condiment holder comprising a receptacle, a perforated top therefor, a rack mechanism, and means located upon the outside of the receptacle for operating the rack mechanism, whereby the perforated top may be rotated.

2. A condiment holder comprising a receptacle, a perforated top therefor, a rack mechanism, and pivotally mounted means located upon the outside of the receptacle for operating the rack mechanism, whereby the perforated top may be rotated.

3. A condiment holder comprising a receptacle, a centrally located vertically disposed shaft therefor, a perforated top secured to the shaft and means located upon the outside of the receptacle whereby the shaft may be rotated to rotate the perforated top.

4. A condiment holder comprising a receptacle, a centrally located vertically disposed shaft therefor, a perforated top secured to the shaft, transversely disposed spring actuated members engageable with the shaft and means located upon the outside of the receptacle and connected to the spring actuated members for operating the same to rotate the shaft and perforated top.

5. A condiment holder comprising a receptacle, a centrally located vertically disposed shaft therefor, a perforated top secured to the shaft, transversely disposed spring actuated racks engageable with said shaft and means located upon the outside of the receptacle and connected to the spring actuated racks for operating the same to rotate the shaft and perforated top.

6. A condiment holder comprising a receptacle, a centrally located vertically disposed shaft therefor, a perforated top secured to the shaft, transversely disposed spring actuated members engageable with the shaft and levers pivotally mounted upon the outside of the receptacle at opposite sides thereof and pivotally connected to the members for operating the same to rotate the shaft and perforated top.

In testimony whereof I affix my signature.

LORENZO REYES.